United States Patent
Hedrich et al.

(10) Patent No.: US 8,551,640 B2
(45) Date of Patent: Oct. 8, 2013

(54) BATTERY PACK

(75) Inventors: Klaus Hedrich, Fischbachtal (DE); Sven Augustin, Rossdorf (DE); Uwe Paulmann, Luedinghausen (DE); Andreas Gutsch, Luedinghausen (DE); Guenter Eichinger, Altenstadt (DE); Andreas Fuchs, Leipzig (DE)

(73) Assignee: Evonik Degussa GmbH, Essen (DE)

( * ) Notice: Subject to any disclaimer, the term of this patent is extended or adjusted under 35 U.S.C. 154(b) by 325 days.

(21) Appl. No.: 12/746,683

(22) PCT Filed: Nov. 13, 2008

(86) PCT No.: PCT/EP2008/065429
§ 371 (c)(1),
(2), (4) Date: Aug. 13, 2010

(87) PCT Pub. No.: WO2009/074421
PCT Pub. Date: Jun. 18, 2009

(65) Prior Publication Data
US 2010/0316895 A1    Dec. 16, 2010

(30) Foreign Application Priority Data

Dec. 11, 2007  (DE) .......................... 10 2007 059 805

(51) Int. Cl.
*H01M 2/26* (2006.01)
*H01M 6/42* (2006.01)

(52) U.S. Cl.
USPC ............ 429/161; 429/158; 429/159; 429/160

(58) Field of Classification Search
None
See application file for complete search history.

(56) References Cited

U.S. PATENT DOCUMENTS

| 6,096,173 | A | 8/2000 | Von Hippel et al. |
| 6,458,750 | B1 | 10/2002 | Dardin et al. |
| 6,632,560 | B1 * | 10/2003 | Zhou et al. ...................... 429/99 |
| 7,235,298 | B2 | 6/2007 | Katusic et al. |
| 7,288,501 | B2 | 10/2007 | Auer et al. |
| 7,374,743 | B2 | 5/2008 | Katusic et al. |

(Continued)

FOREIGN PATENT DOCUMENTS

WO    2007 102670    9/2007

OTHER PUBLICATIONS

U.S. Appl. No. 60/021,600, filed Jul. 11, 1996, Riemenschneider, et al.

(Continued)

*Primary Examiner* — Patrick Ryan
*Assistant Examiner* — Muhammad Siddiquee
(74) *Attorney, Agent, or Firm* — Oblon, Spivak, McClelland, Maier & Neustadt, L.L.P.

(57) ABSTRACT

The invention relates to a battery pack (1) for electric vehicles or vehicles with an electric hybrid drive. The battery pack (1) according to the invention comprises a battery housing (2) and battery cells, which are arranged within the battery housing (2), are self-contained and are electrically connected to one another in order to achieve a desired terminal voltage. A plurality of battery cells are in each case arranged at a distance from one another in a fastening frame (6) and in each case form cell modules (4). The cell modules (4) are in each case arranged on fastening elements, which pass through the battery housing (2), the fastening elements, being in the form of spacers between the cell modules (4) and, with the battery housing (2), forming a bearing unit.

11 Claims, 6 Drawing Sheets

(56) References Cited

U.S. PATENT DOCUMENTS

| | | |
|---|---|---|
| 7,525,788 B2 | 4/2009 | Hoerpel et al. |
| 2001/0036437 A1 | 11/2001 | Gutsch et al. |
| 2001/0055639 A1 | 12/2001 | Moritz et al. |
| 2003/0206854 A1 | 11/2003 | Gutsch et al. |
| 2005/0142439 A1* | 6/2005 | Lee et al. ............... 429/163 |
| 2005/0221192 A1 | 10/2005 | Hennige et al. |
| 2006/0177733 A1* | 8/2006 | Ha et al. ............... 429/159 |
| 2007/0009790 A1* | 1/2007 | Vutetakis et al. ............ 429/160 |
| 2007/0141458 A1* | 6/2007 | Nagatani et al. ............ 429/158 |
| 2007/0175362 A1 | 8/2007 | Gutsch et al. |
| 2007/0184993 A1 | 8/2007 | Scherer et al. |
| 2007/0213237 A1 | 9/2007 | Scherer et al. |
| 2007/0219101 A1 | 9/2007 | Scherer et al. |
| 2007/0254178 A1 | 11/2007 | Nun |
| 2008/0020190 A1 | 1/2008 | Nun et al. |
| 2008/0032197 A1 | 2/2008 | Horpel et al. |
| 2008/0084686 A1 | 4/2008 | Gutsch et al. |
| 2008/0138700 A1 | 6/2008 | Horpel et al. |
| 2008/0280050 A1 | 11/2008 | Nun et al. |
| 2008/0283171 A1 | 11/2008 | Nun et al. |
| 2008/0305702 A1 | 12/2008 | Nun et al. |
| 2009/0078485 A1 | 3/2009 | Gutsch et al. |
| 2010/0000079 A1 | 1/2010 | Horpel et al. |
| 2010/0003401 A1 | 1/2010 | Horpel et al. |

OTHER PUBLICATIONS

U.S. Appl. No. 08/842,775, filed Apr. 17, 1997, Riemenschneider, et al.

U.S. Appl. No. 09/441,439, filed Nov. 17, 1999, Barthold, et al.

U.S. Appl. No. 60/194,367, filed Apr. 4, 2002, Michael, et al.

* cited by examiner

BATTERY PACK

FIELD OF THE INVENTION

The invention relates to a battery pack for electric vehicles or vehicles with an electric hybrid drive.

Recently, interest has turned to vehicles which are driven by the drive force of an electric motor, for example hybrid vehicles, fuel cell vehicles, electric vehicles etc. Such vehicles are generally less damaging to the environment than motor vehicles which are driven exclusively by internal combustion engines. These vehicles are equipped with a battery, a capacitor or the like for storing electrical energy, which is intended to be supplied to one or more electric motors.

The term "battery" in the context of the present application should be understood to mean an electric energy store which can be both rechargeable and non-rechargeable. To this extent, the application text does not draw any distinction between the terms "accumulator", on the one hand, and "battery", on the other hand. The term "battery" in the context of the application can also be understood to mean a capacitor.

Batteries in the form of electrochemical voltage sources in many cases comprise a series circuit and/or parallel circuit comprising a large number of battery modules, which, if desired, are formed by a series circuit and/or parallel circuit comprising a large number of battery cells. The battery cells comprise two electrodes, which are separated by a separator, and an electrolyte which is generally in liquid or gel form.

For example, modern lithium-ion or lithium-metal batteries or accumulators are hermetically encapsulated since lithium is a highly reactive metal and the components of a lithium-ion accumulator are readily combustible. Such battery cells are sensitive to mechanical damage which can lead to internal short circuits, for example. As a result of an internal short circuit and when in contact with air, lithium-ion batteries or lithium-metal batteries can ignite. As a result of their extremely high storage capacity given a comparatively small space requirement, battery cells on a lithium-ion basis are particularly suitable for the manufacture of batteries for electric vehicles. Installing batteries in vehicles, however, is subject to particular requirements as regards the protection of the battery cells from mechanical and thermal damage.

It can readily be envisaged that the batteries that need to be provided for electric vehicles are those which have a comparatively high storage capacity and a relatively high terminal voltage. In particular for the automotive industry, for example for entirely electric vehicles, the battery cells need to have a corresponding size and, owing to the high specific weight of the electrodes, have a high absolute weight. As has already been mentioned above, for example, battery cells based on lithium ions or lithium metal are mechanically sensitive, with the result that particular measures need to be taken when installing them in a motor vehicle in order to protect the battery cells from mechanical damage. In the case of a modern passenger vehicle, forces due to acceleration of two to three times the acceleration due to gravity are to be expected in each spatial axis during normal operating cycles. Such forces have an effect on the vehicle during acceleration, deceleration, cornering and when traveling over uneven surfaces. Furthermore, it is absolutely necessary to protect a battery installed in a motor vehicle from mechanical effects owing to a collision and from forces due to acceleration owing to a collision. Furthermore, the batteries and therefore the battery cells and the connections thereof are subject to vehicle-dependent vibrations.

Finally, the battery is heated both during charging and during discharging cycles. Depending on the solar radiation, temperatures of up to 60° C. can prevail in a passenger compartment of a passenger vehicle without the addition of the thermal effects of the drive and of a battery, which likewise needs to be taken into consideration to a significant extent when designing a vehicle battery.

PRIOR ART

A large battery pack for a hybrid locomotive which is constructed in such a way that it permits predominantly free convective cooling of the individual battery cells is known, for example, from WO 2007/047 809 A2. In a known manner, this battery pack comprises individual modules which are arranged in withdrawable compartments of a rack system, which is in the form of a bearing structure. The individual modules each comprise two cells, which are fastened in the withdrawable compartments at a distance from one another. The compartments are designed in such a way that the individual modules are thermally isolated from one another, the cells being arranged at such a distance from one another that at least one convection channel is formed which permits heat to be dissipated upwards. The entire rack arrangement is supported by horizontal and vertical insulators in the form of shock absorbers. These shock absorbers allow for the restricted movability of the entire arrangement, which is surrounded by a hood which is ventilated or can be mechanically ventilated.

The arrangement described in WO 2007/047 809 A2 which weighs of the order of magnitude of from 15 to 30 t could be suitable for use on an electric railcar or an electric locomotive and in this context could provide optimum protection for the batteries, but such an arrangement is not suitable for use in a passenger vehicle, especially also for space reasons.

An arrangement of individual cells or modules of a battery which, when standing alone, is safe from vibrations owing to the convective dissipation of heat cannot be implemented in the restricted physical space available in a passenger vehicle.

OBJECT

Even modern lithium-ion or lithium-metal batteries are characterized by a high energy density which appears to make them suitable for use in a passenger vehicle.

The invention is therefore based on the object of providing a battery pack for electric vehicles or vehicles with an electric drive which enables sufficient protection against mechanical damage to the battery cells owing to vibrations and forces due to acceleration which may occur with optimum utilization of the installation space available in a passenger vehicle. Furthermore, the battery pack according to the invention is also intended to be designed in such a way that thermal overloading of the battery cells is largely avoided.

SOLUTION

The object is achieved by a battery pack for electric vehicles or vehicles with an electric hybrid drive, comprising a battery housing and battery cells, which are arranged within the battery housing, are self-contained and are electrically connected to one another in order to achieve a desired terminal voltage, a plurality of battery cells in each case being arranged at a distance from one another in a fastening frame and in each case forming cell modules, the cell modules in each case being arranged on fastening elements, which pass through the battery housing, are in the form of spacers between the cell modules and, with the battery housing, form a bearing unit.

The battery pack according to the invention is in this case characterized in particular by a very compact and space-saving design. In particular the fact that the spacers of the cell modules form a bearing unit with the battery housing ensures that all of the forces which occur in the installed situation in the vehicle are transferred from the individual cells to the battery housing. This type of force transfer ensures that no oscillations of the cells occur or relative movements between the cells and the battery housing take place.

Expediently, at least some of the fastening elements are in the form of profiled rods, which support at least two of the surrounding walls of the battery housing with respect to one another.

In a preferred variant of the battery pack according to the invention, provision is made for the fastening frames of the cell modules to form part of the bearing unit, as a result of which increased stability is achieved without any additional use of materials. The individual fastening frames hold the cells arranged therein at a distance from one another, with the result that the cells are kept substantially free from forces during acceleration or deceleration of the vehicle and the forces occurring are introduced, via the fastening frames, into the fastening elements, and from the fastening elements into the battery housing. The battery housing is expediently fastened on a corresponding receptacle in the motor vehicle.

Preferably, the cells are mounted within a fastening frame in a flexible manner at least in the direction of a spatial axis. Said cells can be suspended in the fastening frame with strips of elastomer, strips of felt, strips of thermoplastic or the like interposed, for example. The design according to the invention permits restricted movability of the individual cells, without the cells needing to absorb forces from adjacent cells for this purpose.

The cell modules are expediently connected to one another via electrical connectors. The connectors can comprise a light metal, for example. In one variant of the battery pack according to the invention, provision is made for the connectors to comprise aluminum. Particularly favorable emission of heat to the surrounding environment is thus ensured.

In a particularly advantageous configuration of the battery pack according to the invention, provision is made for the inventors to be in the form of rectangular plates with a surface-to-volume ratio [$m^2/m^3$] of 0.3 to 2.0. This design has proven to be particularly favorable as regards the emission of heat.

For the purpose of optimum utilization of space in the battery housing, the cell modules can be arranged row by row in a plurality of rows within the battery housing.

In this case, it is particularly expedient for thermal reasons if the row-by-row arrangement of the cell modules is selected such that interspaces between the cells of respectively adjacent rows are aligned with one another and/or communicate with one another. In this way, a favorable airflow through the battery housing can be achieved.

In one variant of the battery pack according to the invention, provision is made for the fastening elements of a plurality of cell modules, which are arranged in rows one above the other and/or adjacent to one another, to be connected to one another to form a grid structure.

It is expedient if the battery housing has at least one air intake and one air discharge opening, which permit both dynamic-pressure-induced and convective through-ventilation of the battery housing. For this purpose, the battery housing can be connected, for example by means of the air intake opening, to an air channel of the motor vehicle. When the motor vehicle is at a standstill, the dynamic-pressure-induced airflow is no longer required owing to driving dynamics. In this case, convective emission of heat or through-ventilation of the battery housing by means of an additional fan is possible.

The profiled rods passing through the battery housing are expediently in the form of T profiles.

The battery cells are expediently in the form of electrodes accommodated in plastic films with separators arranged between said electrodes and with a liquid electrolyte, said electrodes in each case having two flexible connecting lugs, which are connected to the connectors in such a way that no notable forces are introduced into the battery cells as a result of a relative movement between the battery cells and the connectors.

The separators provided in the battery cells can have, for example, a ceramic surface and comprise a flat flexible substrate provided with a large number of openings and with a coating located on and in said substrate. The material of the substrate can comprise woven or nonwoven, electrically non-conductive natural or polymeric fibers. The coating may be a porous, electrically insulating, ceramic coating. The separators can be filled with an electrolyte composition, which has a conductive salt and a base component, the base component having, as main constituent with a proportion of greater than 50 mass %, at least one ionic liquid, which has a melting point of below 100° C.

The electrodes and separators can each be welded into a pocket consisting of an aluminum polymer material. Each cell can have, for example, a capacity of approximately 40 ampere hours. The size of such a battery cell can be, for example, approximately 20×30×10 mm. Such a battery cell has, for example, a weight of 1 kg. A battery pack according to the invention can have between 100 and 200 such cells.

The invention will be explained below with reference to an exemplary embodiment illustrated using drawings.

In the drawings, an exemplary embodiment of the battery pack 1 according to the invention is illustrated. The battery pack 1 comprises a battery housing 2 and battery cells 3 suspended in the battery housing 2, which battery cells are in the form of an electrochemical voltage source on the basis of lithium. Each battery cell 3 is in the form of a lithium-ion battery or lithium-ion accumulator and comprises, as has already been mentioned above, two electrodes which are separated by a separator and are welded into a plastic pocket together with an electrolyte. The battery cells 3 are in the form of hermetically sealed battery cells 3 with in each case two connecting lugs.

In each case two battery cells 3 are connected in parallel with one another, and in each case two battery cells 3 which are connected in parallel with one another are connected in series within a cell module 4.

Figure 2:
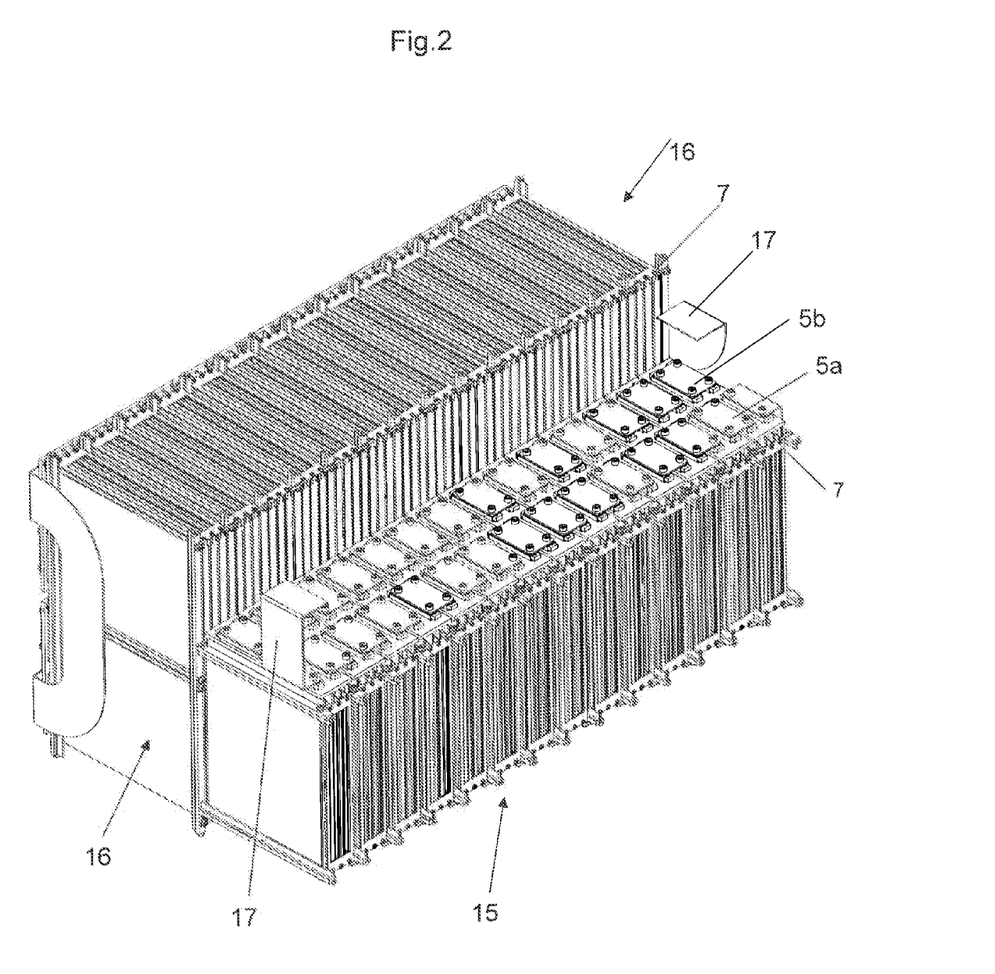
FIG. 2 shows a perspective view of the cell modules arranged in rows within the battery housing without the surrounding walls of the battery housing.
Figure 3:
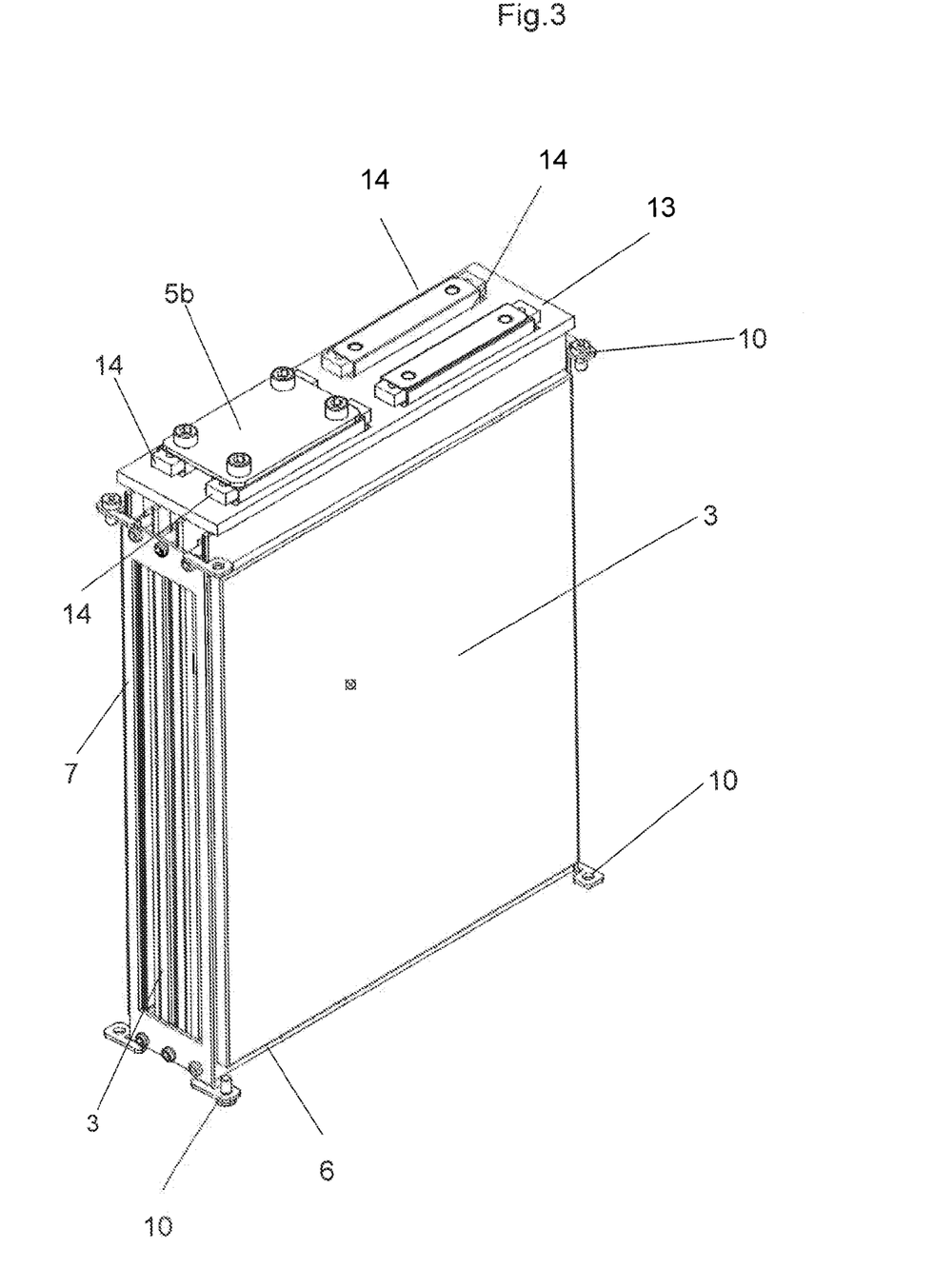
FIGS. 3 and 4 show perspective views of the cell modules of the battery pack according to the invention.
Figure 4:
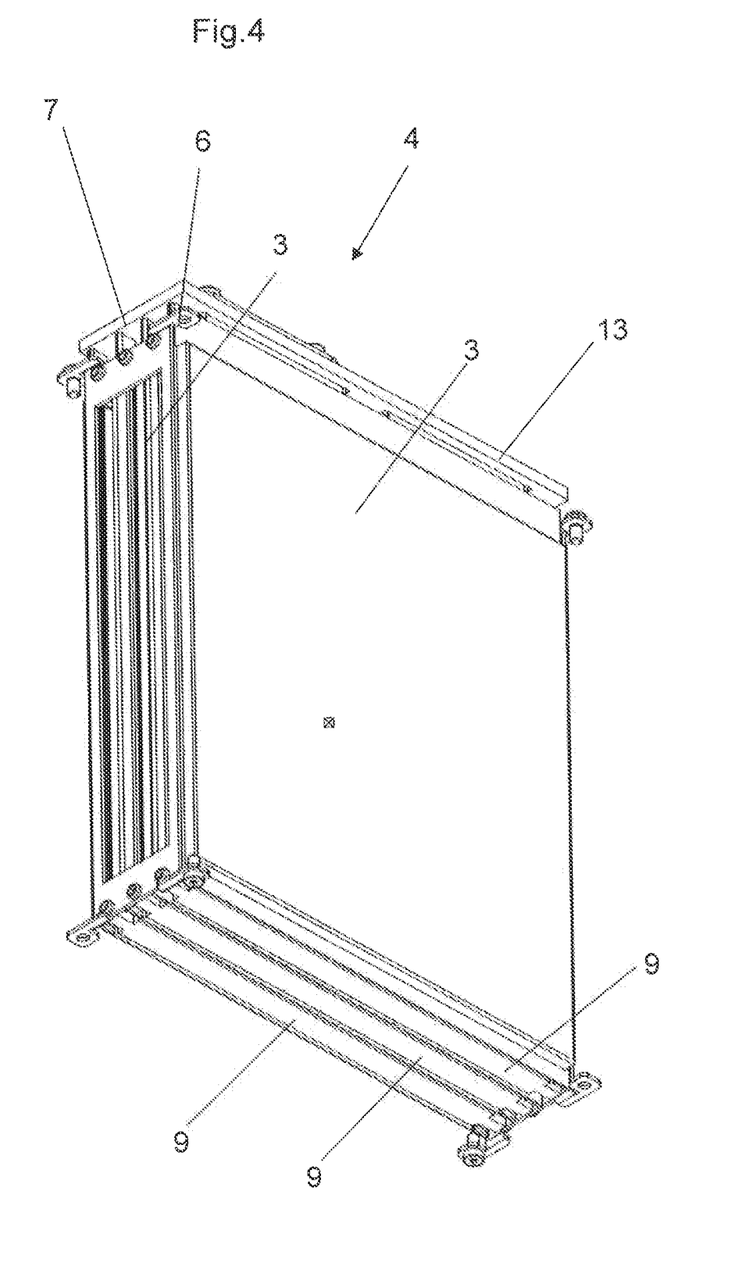

The cell modules 4 are illustrated by way of example in FIGS. 3 and 4. These cell modules 4 are arranged in rows within the battery housing 2, as can be seen in FIG. 2, and connected electrically in series. The connection of the cell modules 4 with respect to one another is brought about by connectors 5a, which are in the form of aluminum plates which are rectangular in cross section. In each case two pairs of battery cells are connected in series with one another within a cell module 4 via the connectors 5b.

FIGS. 3 and 4 illustrate the cell modules 4 in each case in a perspective view. As has already been mentioned above, each cell module 4 comprises four battery cells 3, which are suspended in a fastening frame 6. The fastening frame 6 comprises two end-side covers 7, which are in the form of stamped aluminum sheets with an air intake opening 8, and spacers 9 which extend between said covers and between the individual battery cells 3. The spacers 9 have a profile which is the form of a T in cross section and are in the form of aluminum extruded profiles. As can be seen from FIGS. 3 and 4, the spacers 9, in each case six in number, are each screwed at their end sides to the covers 7. The covers 7 in each case comprise four fastening eyelets 10 which are provided with bores and with which said covers can be secured in the installed position.

Figure 1:
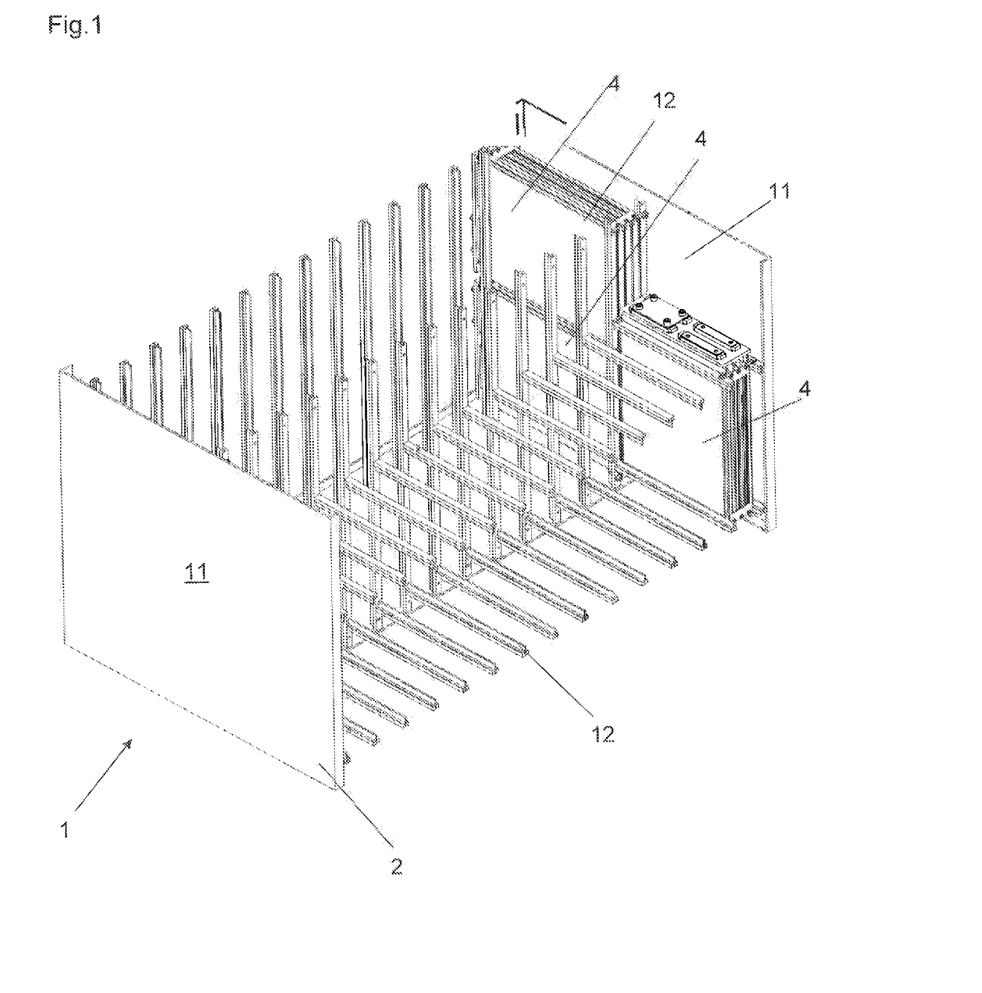
FIG. 1 shows a perspective view of an open battery housing with fastening elements arranged therein and cell modules arranged therein.

Reference will first be made below to FIG. 1. In FIG. 1, parts of the battery housing 2 are illustrated without the cell modules 4, which are likewise in the form of a bearing part of the battery pack 1. The battery housing 2 is formed by in total six surrounding walls 11, of which only two end-side surrounding walls 11 are illustrated in FIG. 2. Spacers 12 likewise extend between said surrounding walls 11, said spacers passing through the battery housing 2 and supporting the surrounding walls 11 in such a way that said spacers, together with the cell modules 4 and the surrounding walls 11 form a bearing unit. The spacers denoted by 12 are likewise in the form of aluminum extruded profiles with a T-shaped cross section. As is likewise illustrated in FIG. 1, the fastening eyelets 10 of the covers 7 of the fastening frames 6 forming the cell modules 4 are secured on the spacers 12 by means of screw-type connections.

Figure 5:
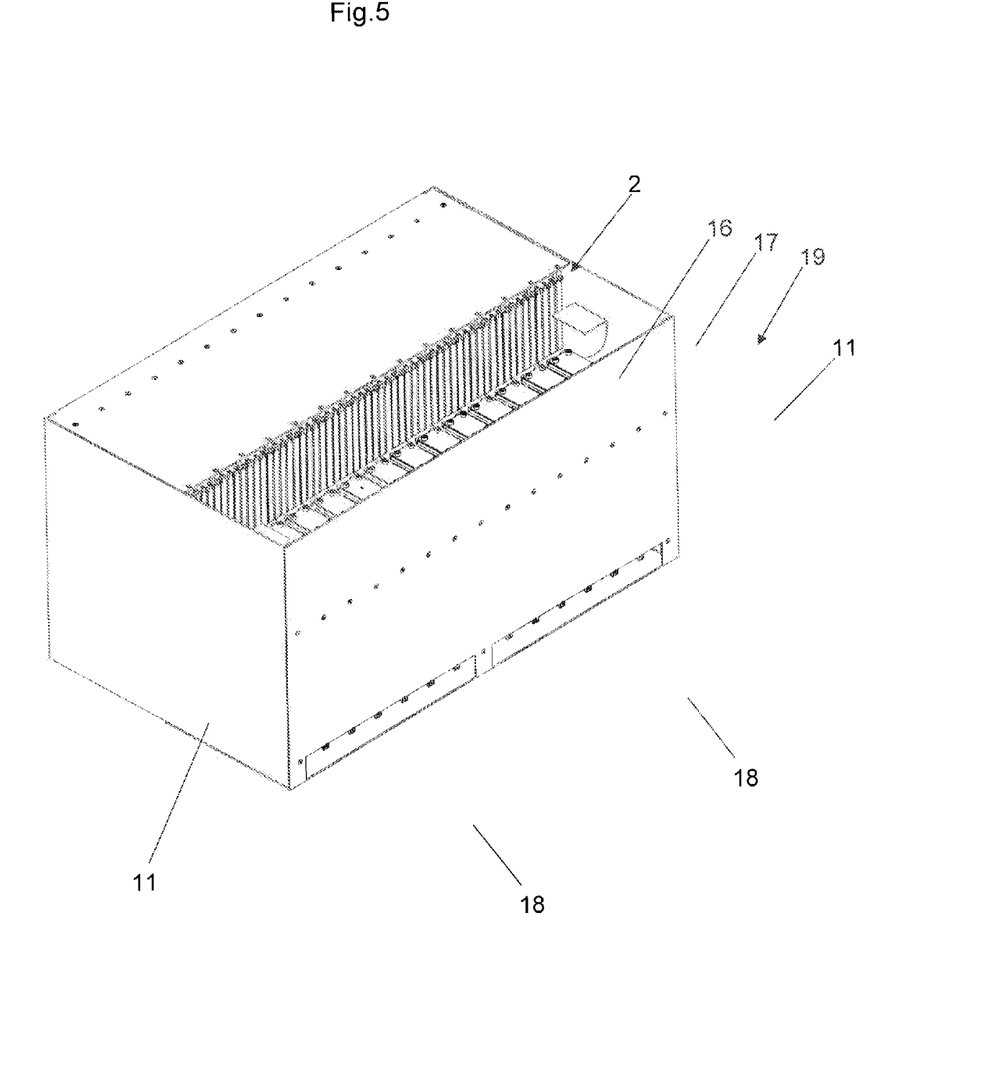
FIG. 5 shows a perspective view of the battery pack according to the invention with the battery housing closed, with the air intake openings being arranged on that side of the battery housing which faces the viewer.

In FIGS. 1, 2 and 5, the battery pack 1 according to the invention is depicted in the installed position in such a way that the front side faces the viewer. For reference purposes, the vertical shown in FIG. 1 is defined as the Y direction, the longitudinal extent of the battery housing 2 is defined as the X direction and the depth of the battery housing 2 is defined as the Z direction. As can readily be seen from the drawing, the spacers 12, which act as fastening elements, extend within the battery housing 2 only in the direction of the Y axis and the Z axis, but not in the direction of the X axis. The stability in the direction of the X axis is produced by the cell modules 4 and the interconnection thereof itself.

As can also be seen, inter alia, from FIG. 3, the cell modules 4 have a connecting plate 13, which receives the connectors 5a, 5b. The connecting plate 13 is rigidly connected to the covers 7. In each case two battery cells 3 of a cell module 4 are connected in series with one another via the connector 5a illustrated in FIG. 3. The connector 5a is screwed to sockets 14 of the connecting plate 13. Each connecting plate 13 comprises four such sockets. The sockets which are free in FIG. 3 are used for receiving the connectors 5b, by means of which the cell modules are connected to one another in a row one below the other, i.e. to form a self-supporting interlock.

The arrangement of the cell modules 4 with respect to one another is shown in particular in FIG. 2.

The cell modules are in each case connected to one another in three rows, namely one vertical row 15 and two horizontal rows 16, to form a battery.

It is clear to a person skilled in the art that the number of cell modules 4 in a row, the number of rows and also the arrangement of the rows 15, 16 with respect to one another are dependent on the assembly of the battery pack 1.

17 denotes the connecting terminals of the battery pack 1.

As has already been mentioned at the outset, the connectors 5a, 5b are in the form aluminum plates with a rectangular cross section, said aluminum plates, apart from their bearing function within the battery pack 1, also being used to dissipate heat during operation.

Reference is now made to FIG. 5, in which the battery pack 1 is illustrated completely with the battery housing 2 closed, to be precise in a view from the front.

The front surrounding wall 11 of the battery housing 2 is provided with two air intake openings 18, which act as inlet openings for a dynamic-pressure-induced airflow. This airflow can be generated either by a fan or by incident flow owing to the driving dynamics of the motor vehicle in which the battery pack 1 is installed. The airflow enters the battery housing 2 in the direction of the Z axis and passes through the vertical row 15 of cell modules 4. These cell modules 4 are arranged in such a way that the air intake openings 8 of the covers 7 of each cell module 4 face the incident air. The individual cells 3, as has already been mentioned above, are arranged within the cell module 4 at a distance from one another by means of the spacers 9.

Once the cooling air has passed through the vertical row of cell modules 4, the flow is circulated through the rows 16 which lie one above the other in such a way that a flow roll is produced within the battery housing 2, which flow roll again emerges from the air outlet denoted by 19. This air outlet 19 additionally ensures the accessibility of the connection terminals 17.

Figure 6:
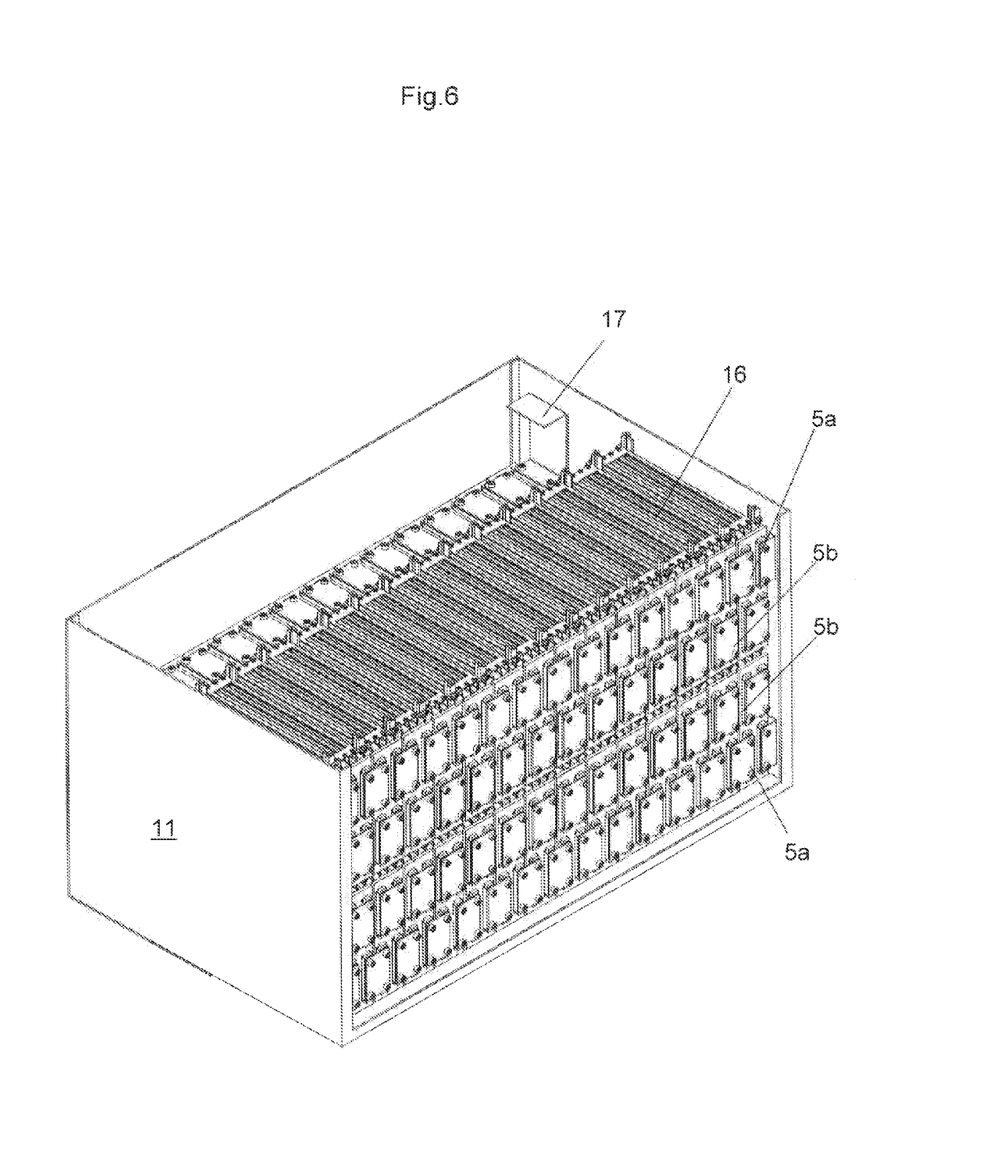
FIG. 6 shows a rear view of the partially open battery housing with cell modules arranged in rows therein.

FIG. 6 illustrates the rear view of the battery housing 2 and of the battery pack 1, the rear surrounding wall being omitted for illustrative reasons.

As can be seen in particular from FIG. 5, the surrounding walls 11 are screwed to the profiled rods in the form of spacers 12. Thus, the entire structure is provided with extremely high stability with respect to forces due to acceleration acting possibly on the battery pack 1 in the installed situation. As has previously been mentioned, the forces acting in the direction of the X axis are absorbed by the fastening frames 6 which are supported against one another in this direction, each battery cell 3 being suspended within the fastening frame in movable fashion within certain limits. This is achieved by virtue of the fact that in each case strips of felt are arranged between the spacers 9 and the cells, which strips of felt keep the individual battery cell 3 substantially free from forces. Instead of strips of felt, strips of elastomer or the like can also be arranged between the spacers 9 and the respective battery cell 3.

As has already been mentioned at the outset, the battery cells 3 are each in the form of film pockets. The spacers 9 have a profile which is in each case in the form of a T in cross section, each spacer 9 forming an angle whose ray length corresponds to approximately half the thickness of the battery cells 3. A battery cell 3 can thus, in a manner comparable to a window pane in a frame, be mounted movably in each case between two upper and two lower spacers 9 with a strip of felt or strip of film or strip of elastomer interposed.

The connectors 5b produce both an electrical and a mechanical connection between the individual fastening frames 6, with the result that these connectors 5b can likewise form part of the bearing structure.

LIST OF REFERENCE SYMBOLS

1 Battery pack
2 Battery housing
3 Battery cells
4 Cell module
5a, 5b Connectors
6 Fastening frames
7 Covers
8 Air intake openings
9 Spacers
10 Fastening eyelets
11 Surrounding walls
12 Spacers
13 Connecting plate
14 Sockets
15 Vertical row of cell modules
16 Horizontal row of cell modules
17 Connecting terminals
18 Air intake openings
19 Air outlet

The invention claimed is:

1. A battery pack, comprising a battery housing and a plurality of electrically connected battery cells arranged within the battery housing, wherein
said battery cells are arranged at a distance from one another in a plurality of fastening frames forming a plurality of individual cell modules, said cell modules each having an individual electrical connector on at least one surface thereof,
the fastening frames of the cell modules in each case being connected to T-shaped spacers which pass through the battery housing between the cell modules connecting at least two cell modules in a vertical orientation through the electrical connectors, to form a bearing unit,
wherein the electrical connectors are in the form of rectangular plates with a surface-to-volume ratio [$m^2/m^3$] of 0.3-2.0.

2. The battery pack according to claim 1, wherein the fastening elements are in the form of profiled rods, which support at least two surrounding walls of the battery housing with respect to one another.

3. The battery pack according to claim 1, wherein the fastening frames of the cell modules form part of the bearing unit.

4. The battery pack according to claim 1, wherein the battery cells are mounted within a fastening frame in a flexible manner at least in the direction of a spatial axis with respect to the fastening frame.

5. The battery pack according to claim 1, wherein the electrical connectors comprise a light metal.

6. The battery pack according to claim 1, wherein the electrical connectors comprise aluminum.

7. The battery pack according to claim 1, wherein the cell modules are in a row-by-row arrangement in a plurality of rows within the battery housing.

8. The battery pack according to claim 7, wherein the row-by-row arrangement of the cell modules is selected such that the interspaces between the cells of respectively adjacent rows are aligned with one another and/or communicate with one another.

9. The battery pack according to claim 1, wherein the fastening elements of a plurality of cell modules, which are arranged in rows one above the other and/or adjacent to one another, are connected to one another to form a grid structure.

10. The battery pack according to claim 1, wherein the battery housing comprises at least one air intake and air discharge opening, which permit both dynamic-pressure-induced and convective through-ventilation of the battery housing.

11. The battery pack according to claim 1, wherein the battery cells are each in the form of electrodes accommodated in plastic films with separators arranged between said electrodes with a liquid electrolyte, and in each case have two flexible connecting lugs, which are connected to electrical connectors.

* * * * *